United States Patent
Aihara (10) Patent No.: US 8,224,084 B2
(45) Date of Patent: Jul. 17, 2012

(54) IMAGE PROCESSING METHOD, IMAGE PROCESSING APPARATUS, AND COLOR IMAGE GENERATING SYSTEM

(75) Inventor: Nobuhiro Aihara, Osaka (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 162 days.

(21) Appl. No.: 12/868,532

(22) Filed: Aug. 25, 2010

(65) Prior Publication Data

US 2011/0052057 A1    Mar. 3, 2011

(30) Foreign Application Priority Data

Aug. 26, 2009   (JP) .................................. 2009-195258

(51) Int. Cl.
*G06K 9/00*   (2006.01)

(52) U.S. Cl. ...................................... 382/167; 382/162

(58) Field of Classification Search .................. 382/162, 382/164, 167, 274; 358/1.9, 500, 504, 515, 358/518, 520
See application file for complete search history.

(56) References Cited

U.S. PATENT DOCUMENTS 6,842,536 B2 *   1/2005   Aihara .......................... 382/167

FOREIGN PATENT DOCUMENTS

| JP | 10-324025 | 12/1998 |
| JP | 2005-323258 | 11/2005 |

OTHER PUBLICATIONS

Japanese Notification of Reasons for Refusal mailed May 17, 2011, directed to counterpart Japanese Application No. 2009-195258; 6 pages.

* cited by examiner

*Primary Examiner* — Duy M Dang
(74) *Attorney, Agent, or Firm* — Morrison & Foerster LLP (57) ABSTRACT

When a monochrome image is converted into a color image, following criteria are applied. a) Black, white, and a color having lightness according to a pixel value are assigned to minimum and maximum pixel values, and a pixel value therebetween, respectively. b) For the pixel value near but excluding the minimum value, a color in a blue color region is assigned. c) For the pixel value near but excluding the maximum value, a color in a yellow color region is assigned. For the pixel value in a range above those near the minimum value but below near the maximum value, a color in a range of hue from the blue color region to the yellow color region by way of a red color region or a color in the range of hue from the blue color region to the yellow color region by way of a green color region is assigned.

12 Claims, 12 Drawing Sheets

IMAGE PROCESSING METHOD, IMAGE PROCESSING APPARATUS, AND COLOR IMAGE GENERATING SYSTEM

This application is based on Japanese Patent Application No. 2009-195258 filed on Aug. 26, 2009, the contents of which are hereby incorporated by reference.

BACKGROUND OF THE INVENTION

1. Field of the Invention

The present invention relates to an image processing method, an image processing apparatus, and a color image generating system for converting monochrome data into color data.

2. Description of the Related Art

Color documents are often printed in monochrome. Such instances, more often than not, involve a case where an available printer is a monochrome printer or a case where a monochrome printing mode is selected in a color printer to reduce a printing cost. In the monochrome printing, although colors of the document are not reproduced, a grey scale image having shades of gray according to the original colors can be printed. This makes it possible to distinguish, in a certain degree, differences in the original colors from the finished print.

On one hand, color document is printed in monochrome in this way. On the other hand, there are demands for colorization of the monochrome documents. Specifically, there is a case in which a monochrome printed matter or monochrome data is only available at hand, but a color document based thereon is demanded. The colorization in this context does not mean restoration of original colors of an image from which colors were converted into a monochrome image but the colorization according to the shades of gray (lightness). For example, in a case where a document based on which colorization is demanded is a monochrome image converted from original colors, the monochrome document may have portions whose identification from each other is made difficult by the monochromatic conversion because two distinct original colors have been converted into densities (lightness) extremely close to each other. In such a case, colorization makes it possible to colorize again, using colors but may be different from the original, the portions used to be separated by different colors. As a result, such portions can be easily identified from each other.

In the conversion from the monochrome data to the color data, each pixel is assigned with a hue in accordance with its gray level. According to a related art disclosed in JP-H10-324025A, a monochrome image is converted into a color image using a color conversion code that is prepared in advance. In preparing the color conversion code, the lightness is changed in proportion to a gray level of the monochrome image, and at the same time the color saturation and the hue are also changed in proportion to the gray level so that a change in color corresponding to individual steps between levels of gray is made uniform and a change in color perception is made smooth. The colors represented by the color conversion code thus obtained correspond to a helically crawling path on a surface of color space starting from "white" ending at "black" in the color space formed of two cone shapes that are put together at their individual bottom faces as illustrated in FIGS. 4 and 6 of JP-H10-324025A. According to this related art, since the gray levels of the monochrome image are reflected in the lightness of colors, it is possible to obtain a colorized document having a natural contrast.

However, according to the colorization in the related art, colorization for one or both of a halftone portion in the vicinity of the palest (lightest) white and a halftone portion in the vicinity of the densest (darkest) black is not conspicuous. This may result in observation with a reduced number of colors.

SUMMARY OF THE INVENTION

In view of the problems describe above, it is an object of the present invention to realize more vibrant colorization of a monochrome image.

According to an aspect of the present invention, an image processing method is provided for converting a monochrome image into a color image. In the method, when the monochrome image is converted into the color image, a target color to be converted from each pixel of the monochrome image is decided based on following criteria a) to d) according to a pixel value of each pixel. Here, the pixel value represents lightness of each pixel of the monochrome image.

a) A first criterion is applied to the each pixel to decide lightness of the target color for the each pixel. In the first criterion, black is assigned to the pixel value having a minimum value within a possible range the pixel value can take; white is assigned to the pixel value having a maximum value within the range of the pixel value, or a color having lightness according to the lightness represented by the pixel value is assigned to the pixel value.

b) One of the second to fourth criteria is applied to the each pixel in accordance with the pixel value to decide a chromaticity of the target color. In the second criterion, a color in a blue color region is assigned to the pixel value having a value near but excluding the minimum value.

c) In the third criterion, a color in a yellow color region is assigned to the pixel value having a value near but excluding the maximum value.

d) In the fourth criterion, a color in a range of hue starting from the blue color region to the yellow color region by way of a red color region or a color in a range of hue starting from the blue color region to the yellow color region by way of a green color region is assigned to the pixel value having a value in a range between the value near the minimum value and the value near the maximum value but excluding the value near the minimum value and the value near the maximum value.

According to another aspect of the present invention, an image processing apparatus that converts a monochrome image into a color image is provided. The image processing apparatus includes a conversion table that associates a color with a value within a possible range that a pixel value of the monochrome image can take; and a color image generating portion that decides a target color to be converted from each pixel of the monochrome image in accordance with a pixel value of the each pixel. In the conversion table, black is associated with the minimum value. Blue is associated with a first intermediate value that is larger than the minimum value but smaller than the maximum value. A color in a blue region which is close to the blue in hue is associated with the pixel value that is larger than the minimum value but smaller than the first intermediate value. Red or green whose lightness is larger than that of the blue is associated with a second intermediate value that is larger than the first intermediate value but smaller than the maximum value. A color in a range between the blue and the red in a hue circle or a color in a range between the blue and the green in the hue circle is associated with the pixel value that is larger than the first intermediate value but smaller than the second intermediated value. Yellow is associated with a third intermediate value that is larger than the second intermediate value but smaller than the maximum value. A color in a range between the red and the yellow in the hue circle or a color in a range between the green and the yellow in the hue circle is associated with the pixel value that is larger than the second intermediate value but smaller than the third intermediate value. A color in a yellow region which is close to the yellow in hue is associated with the pixel value that is larger than the third intermediate value but smaller than the maximum value. White is associated with the maximum value.

These and other characteristics and objects of the present invention will become more apparent by the following descriptions of preferred embodiments with reference to drawings.

DESCRIPTION OF THE PREFERRED EMBODIMENTS

Image processing for colorizing the shades of gray of a monochrome image is performed when printing is performed by a color printer or displaying in colors is performed by a display unit. The processing target is any given monochrome image having information of gray levels of achromatic or chromatic color, and is not limited to a monochromatic gray scale image converted from a color image. The number of colors of the color image resulted from the image processing corresponds to the number of gray levels in the monochrome image. Processing a monochrome binary image results in a single-color image.

Figure 1A:
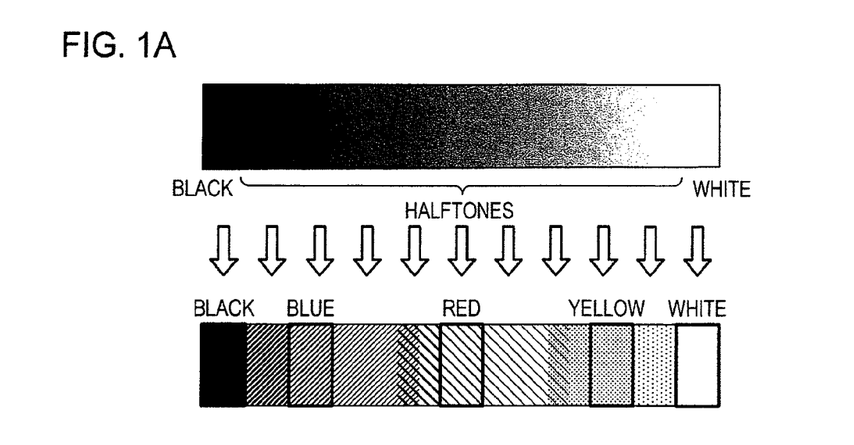
FIGS. 1A to 1C are diagrams schematically illustrating assignments of colors for colorization according to an embodiment of the present invention.
Figure 1B:
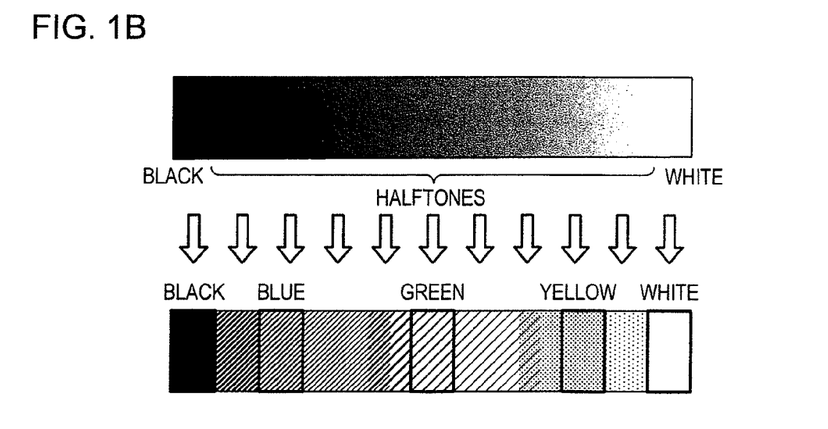
Figure 1C:
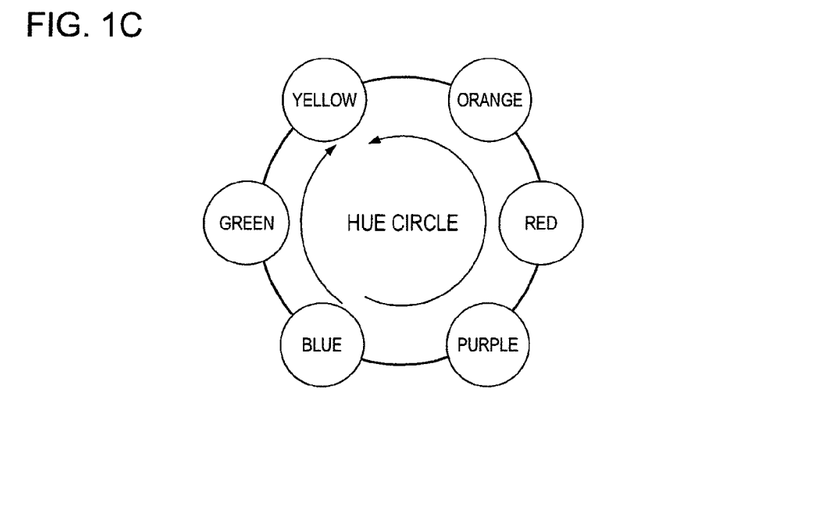

In the image processing according to this embodiment, colors as schematically indicated in FIG. 1A or 1B are assigned to the gray levels of the monochrome image. Two patterns of assignment of colors are involved as indicated in FIGS. 1A and 1B, respectively. One of the two patterns is applied according to the user's instructions or initial settings. These two patterns of assignment have common characteristics. This means that blue is assigned to a dense region (dark portion), and yellow is assigned to a pale region (light portion). In both of the two patterns of assignment, a change in hue from blue to yellow is assigned to a change in gray levels from dark to light. However, the change in hue from blue to yellow involves, as indicated in FIG. 1C, a change by way of red and a change by way of green. To put it differently, there are a change in a clockwise direction and a change in a counterclockwise direction around a hue circle that indicates similarities of colors. Consequently, there are two patterns of assignment. According to the assignment indicated in FIG. 1A, red is assigned to medium lightness, and the colorization based on blue, red, and yellow serving as representative colors is realized. According to the assignment indicated in FIG. 1B, green is assigned to medium lightness, and the colorization based on blue, green, and yellow serving as representative colors is realized. Specific examples involving these blue, yellow, red, and green will be described later.

Figure 2A:
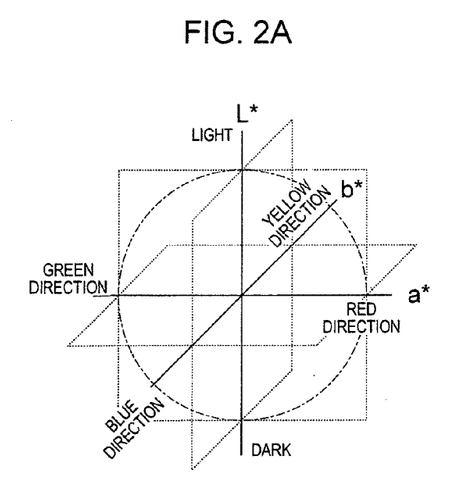
FIGS. 2A to 2D are diagrams illustrating color reproductive regions in outputting a color image.
Figure 2B:
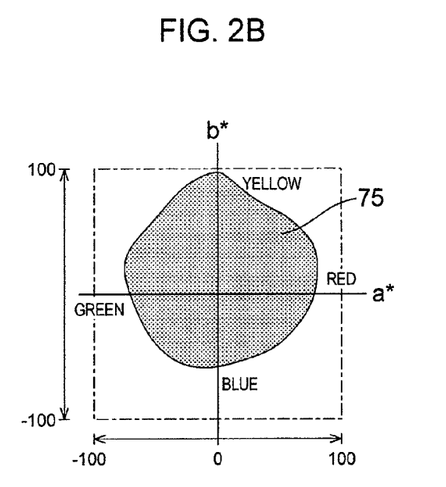
Figure 2C:
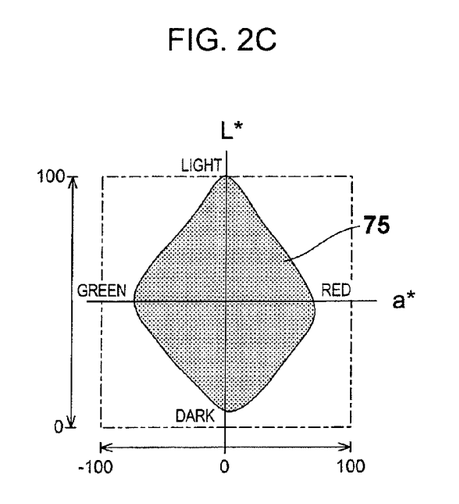
Figure 2D:
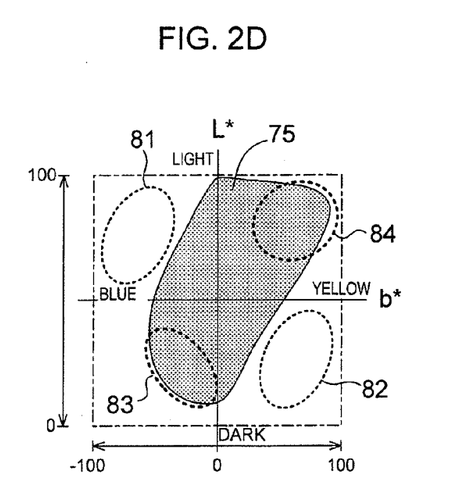

A vibrant color image can be generated by assigning blue and yellow as illustrated in FIGS. 1A to 1C. The reason is indicated in FIGS. 2A to 2D. FIG. 2A illustrates color space of L*a*b* color system, and FIGS. 2B to 2D illustrate cross sections of the a*-b* plane, L*-a* plane, and L*-b* plane of a color reproductive region 75 which is actually in a three-dimensional form. The color reproductive region 75 in the example represents those colors that can be reproduced in color printing by electrophotographic process. Further, a tendency similar to what is described below can also be observed, using other methods, in color printing and color displaying on various types of display units.

What should be noted here is the shape of the color representative region 75 in FIG. 2D. In FIGS. 2B and 2C, the color reproductive region 75 spreads out substantially in a uniform manner to four directions while making a crossing point of the two axes as a center of the space. In contrast, in FIG. 2D, the color reproductive region 75 spreads out less toward left-upper and right-lower directions but more toward right-upper and left-lower directions. This indicates that blue that is lighter and has a high level of color saturation corresponding to a region 81 enclosed by a broken line is not reproduced; yellow that is darker and has a high level of color saturation corresponding to a region 82 is not reproduced, either; dark blue that can be reproduced and corresponds to a region 83 has a high level of color saturation; and yellow that can be reproduced and corresponds to a region 84 has a high level of color saturation.

Accordingly, blue and yellow are preferable as colors to be used in colorizing a monochrome image. In addition, it is important to correlate the gray levels of a monochrome image with the lightness of a colorized image to obtain a color image having a natural contrast. For this purpose, it is effective, as described above, to assign blue to a dense region (dark portion) and yellow to a pale region (light portion). A vibrant color image as obtained by applying the assignment indicated in FIG. 1 can not be obtained if the relationships between the lightness and darkness and blue and yellow are reversed, red or green is assigned to the dark portion, or red or green is assigned to the light portion. For example, it is assumed that red is assigned to the dark portion, it becomes difficult to distinguish red from black, and, if red is assigned to the light portion, it becomes difficult to distinguish red from white. The same is similarly applied to green.

Figure 3A:
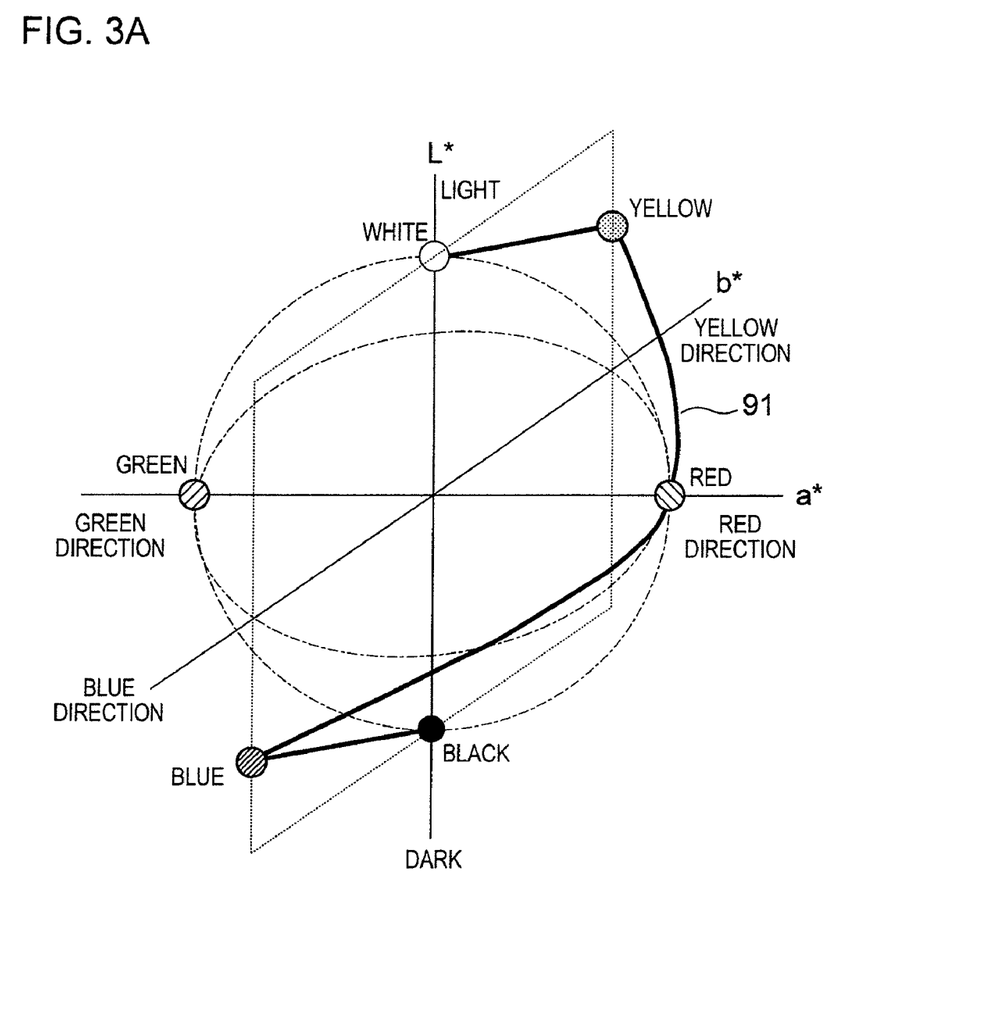
FIGS. 3A and 3B are diagrams schematically illustrating positions of colors in color space arranged to correspond to darkness and lightness in colorization.
Figure 3B:
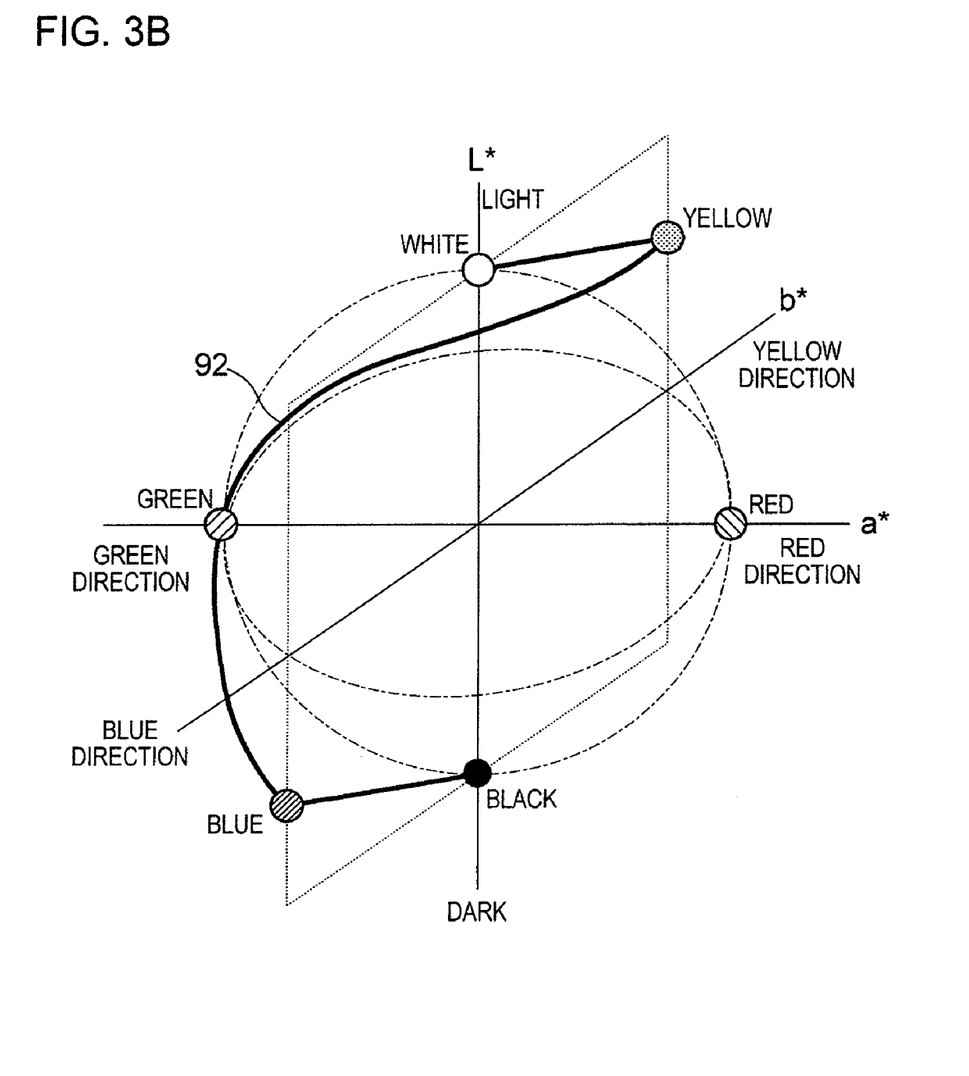

FIGS. 3A and 3B indicate positions of colors involved in colorization in L*a*b* color system. FIG. 3A corresponds to the assignment illustrated in FIG. 1A, and FIG. 3B corresponds to the assignment illustrated in FIG. 1B. FIG. 3A depicts a path 91 starting from black corresponding to the minimum lightness (maximum density) by way of blue, red, and yellow sequentially up to white corresponding to the maximum lightness (minimum density). In the process of colorization employing the assignment depicted in FIG. 1A, the colors on this path 91 are allocated to individual pixels of a monochrome image. FIG. 3B depicts a path 92 starting from black by way of blue, green, and yellow sequentially up to white. In the process of colorization employing the assignment depicted in FIG. 1B, the colors on this path 92 are allocated to individual pixels of a monochrome image.

Figure 4A:
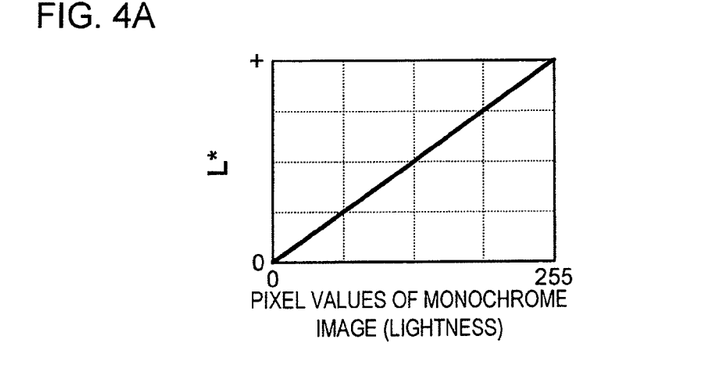
FIGS. 4A to 4C are diagrams schematically illustrating a relationship between input and output of a conversion table for colorization.
Figure 4B:
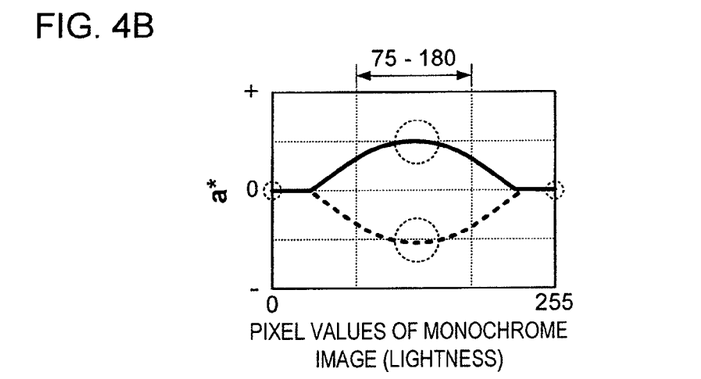
Figure 4C:
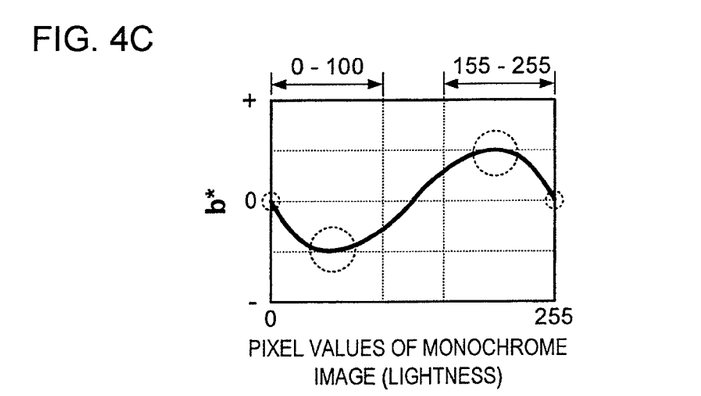

FIGS. 4A to 4C are graphs qualitatively depicting the assignments indicated in FIGS. 1A to 1C by dividing L*a*b* color system into lightness L* and chromaticness indices a* and b*. In FIGS. 4A to 4C, pixel values of a monochrome image on the horizontal axis represent lightness expressed by 8-bit data and take a value from "0" to "255". The minimum value of "0" corresponds to the maximum density in the shades of gray, and the maximum value of "255" corresponds to the minimum density. This means that the larger the pixel value becomes, the paler (lower density) the pixel becomes. Likewise, the smaller the pixel value becomes, the denser the pixel (higher density) becomes.

As illustrated in FIG. 4A, the lightness L* becomes larger as the pixel value becomes greater. To put it differently, the lighter the monochrome image is, the lighter the tone of the color image becomes. Conversely, the darker the monochrome image is, the darker the tone of the color image becomes. According to the example as illustrated, although the lightness L* is proportional to the pixel value, they do not need to be in a proportional relationship. The lightness L* may simply increase as the pixel value increases. It is possible to observe, from FIG. 4A, a colorization condition (a) in which "black corresponds to the minimum pixel value; as the pixel value becomes greater, a color having larger lightness corresponds thereto; and white corresponds to the maximum pixel value."

As illustrated in FIG. 4B, the chromaticness index a* is "0" when the pixel value is or is close to "0", and is also "0" when the pixel value is or is close to "255". When the pixel value ranges between "75" and "180", the chromaticness index a* varies in accordance with the pixel value in such a manner to draw a curve or a polygonal line having a peak either in a "+" direction (direction to red) or "−" direction (direction to green). The change drawn by a solid line having the peak in the "+" direction corresponds to the path 91 depicted in FIG. 3A. The change drawn by a broken line having the peak in the "−" direction corresponds to the path 92 depicted in FIG. 3B.

As illustrated in FIG. 4C, the chromaticness index b* is "0" when the pixel value is "0", and is also "0" when the pixel value is "255". The chromaticness index b* varies in accordance with the pixel value in such a manner to draw a curve or a polygonal line having peaks in a "−" direction (direction to blue) and a "+" direction (direction to yellow) when the pixel value ranges between "0" and "100" and between "155" and "255", respectively.

It is possible to observe, in FIGS. 4B and 4C, the following three conditions (b), (c), and (d) for colorization. (b) A color in the blue color region corresponds to a pixel value near a minimum value of a possible range that the pixel value can take. (c) A color in the yellow region corresponds to a pixel value near a maximum value. (d) A change in the pixel value from near the minimum value to near the maximum value corresponds to only one of a change in hue starting from the blue region to the yellow region by way of the red region and a change in hue starting from the blue region to the yellow region by way of the green region.

Figure 5:
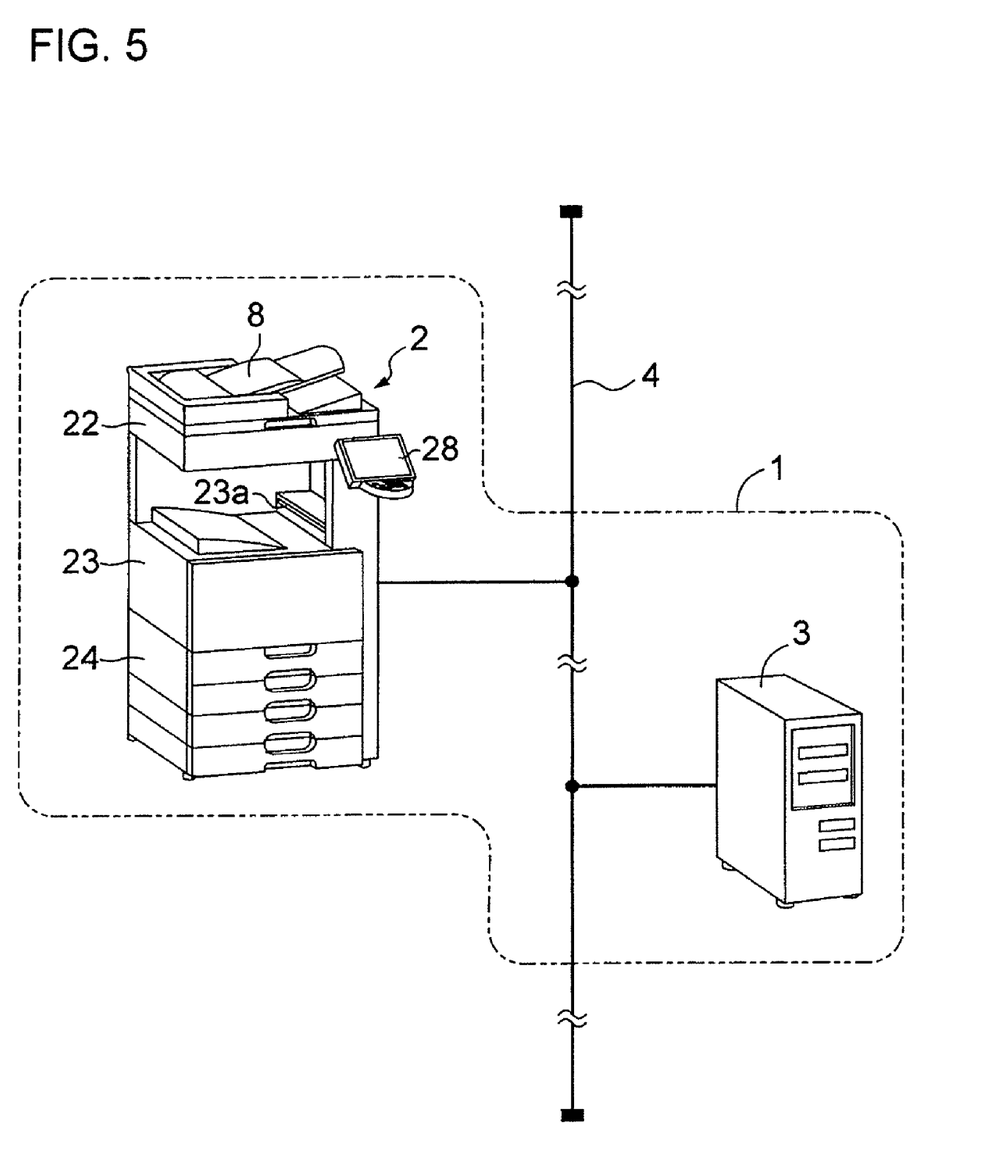
FIG. 5 is a diagram illustrating a hardware configuration of a color image generating system according to an embodiment of the present invention.

The image processing for converting a monochrome image into a color image as discussed above is performed by, for example, a color image generating system 1 illustrated in FIG. 5. The color image generating system 1 is configured of a multifunction apparatus 2 which is an information device called a Multifunction Peripheral (MFP) and a data processing server serving as an image processing device 3. The multifunction apparatus 2 and the image processing device 3 are capable of accessing each other and exchanging data with each other via a network 4 including a wired or wireless communication line. Although the system configuration is illustrated as including multifunction apparatus 2 and the image processing device 3 as separate pieces of equipment, the image processing function available in the image processing device 3 may be incorporated into the multifunction apparatus 2.

The multifunction apparatus 2 is provided with an image scanner 22 serving as an image input device, a color printer 23 serving as an image output device, and a paper feed device 24. The image scanner 22 automatically feeds a document 8 placed by a user to a position where an image is read and optically reads the image recorded on the document 8. The color printer 23 arranged below the image scanner 22 forms an image on paper fed from the paper feed device 24 by electrophotographic process when a job such as copying, network printing, or fax reception is performed. The paper on which the image is formed is ejected through a discharge slot 23a as a printout. The paper feed device 24 is equipped with a multistage paper deck and feeds a piece of paper, selectively, of a size specified by the job to the color printer 23.

According to the color image generating system 1, when a user specifies a copy job for colorizing a monochrome image through operation on an operation panel 28 of the multifunction device 2, monochrome image data read by the image scanner 22 is transmitted to the image processing device 3. Color image data is generated by the image processing device 3 and fed into the multifunction device 2. Then, the color image data is printed by the color printer 23. The sequence of such operation will be described in detail with reference to FIGS. 6 and 7.

Figure 6:
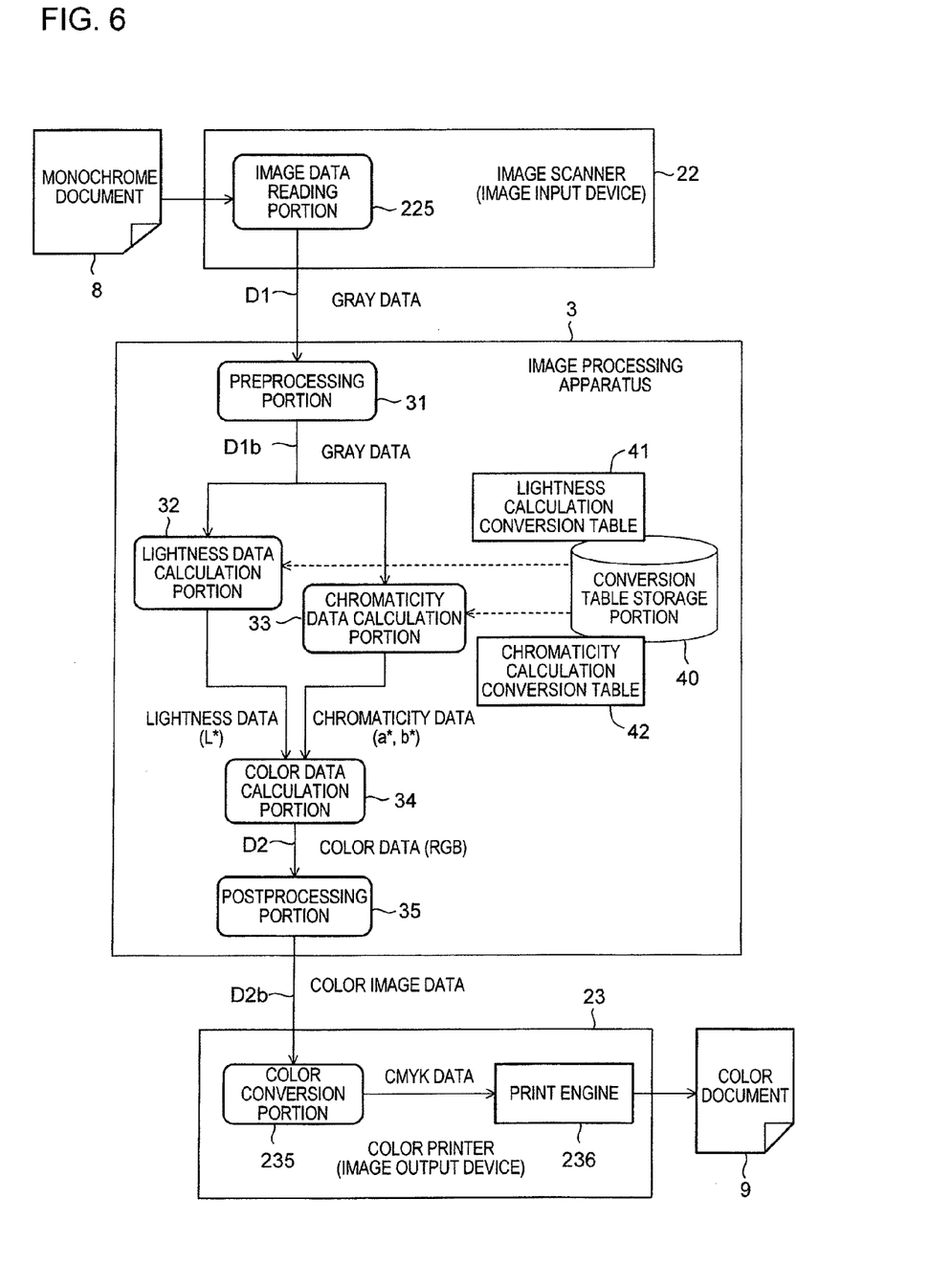
FIG. 6 is a diagram illustrating a functional configuration of the color image generating system.
Figure 7:
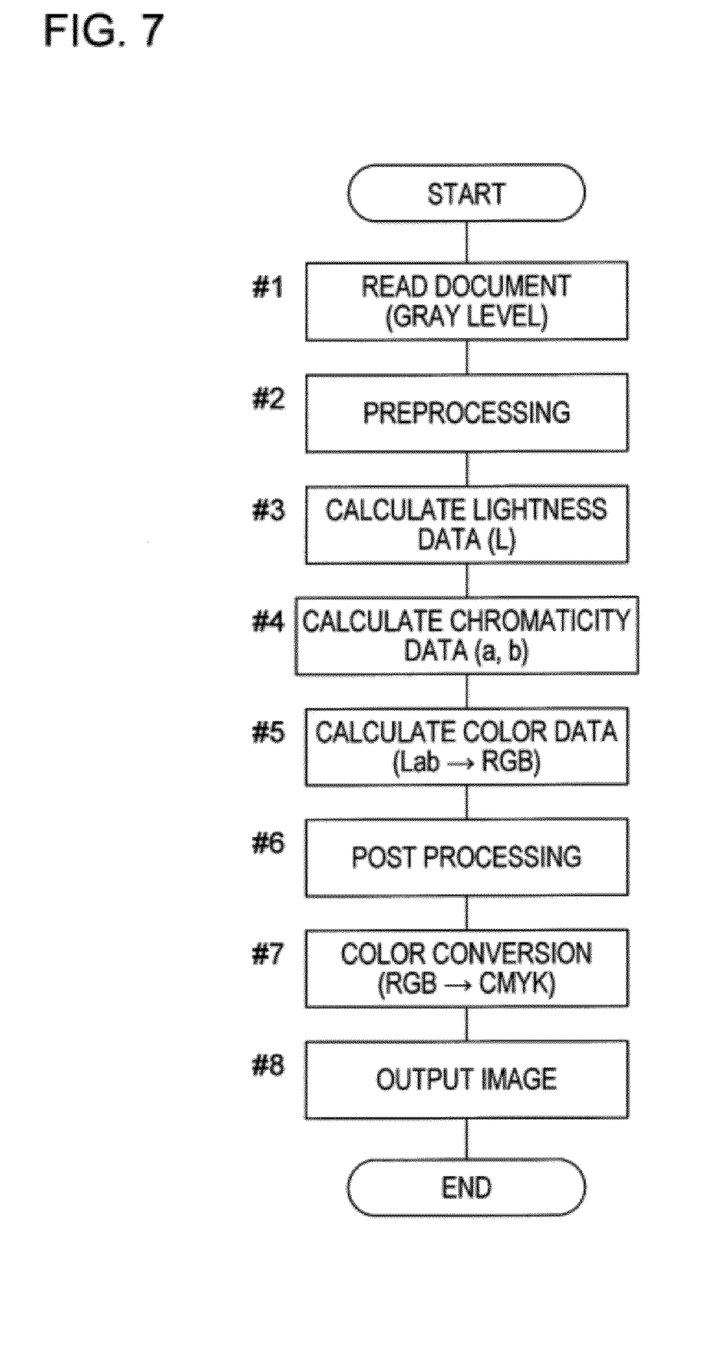
FIG. 7 is a flowchart depicting an outline of a procedure for generating a color image.

Referring to FIG. 6, an image data reading portion 225 reads the monochrome image of the document 8 by segmenting the image into pixels, and outputs gray data D1 indicating pixel values according to the intensity of light entered from the document 8. In the image processing device 3 that has received the gray data D1, a preprocessing portion 31 performs preprocessing such as noise removal or separation of text and image regions from each other. Pre-processed gray data D1 is then fed into a lightness data calculation portion 32 and a chromaticity data calculation portion 33 as data common thereto and as density information. A lightness calculation conversion table 41 and a chromaticity calculation conversion table 42 are stored in advance in a memory 40 serving as a conversion data storage portion provided in the image processing device 3. The lightness calculation portion 32 refers to the lightness calculation conversion table 41 and outputs lightness data (L*) identifying lightness of a color to be converted to for each pixel. The chromaticity data calculation portion 33 refers to the chromaticity calculation conversion table 42 and outputs chromaticity data (a*, b*) identifying a chromaticity and color saturation of the color to be converted to for each pixel. A color data calculation portion 34 generates color data D2 in RGB color system based on the lightness data (L*) and the chromaticity data (a*, b*). This means that the color data calculation portion 34 performs a predetermined computation for converting one color system into another. The color data D2 thus generated are then subjected to predetermined postprocessing including a smoothing process to reduce color unevenness by a postprocessing portion 35. The postprocessed data is transmitted to the color printer 23. In the color printer 23, a color conversion portion 235 converts the color image data D2 expressed in RGB into CMYK data that is suitable for subtractive color mixing. Then, a print engine 236 prints the CMYK data on paper 9 using color materials of cyan (C), magenta (M), yellow (Y), and black (K). The outline of the operation is indicated in steps #1 to #8 in FIG. 7.

First Embodiment

Figure 8A:
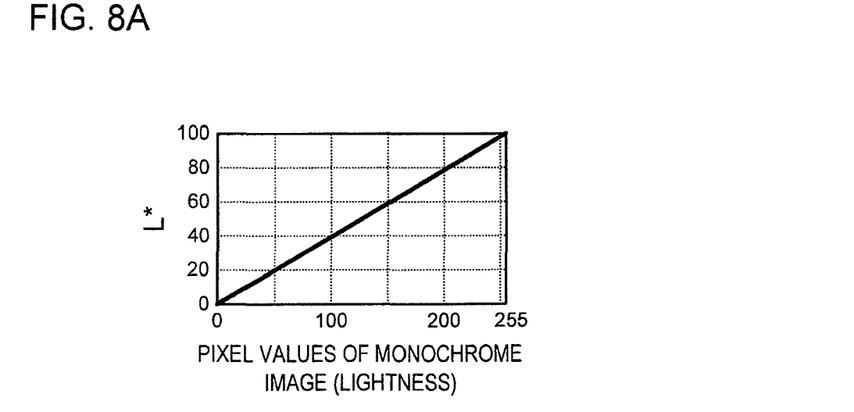
FIGS. 8A to 8C are diagram illustrating a first example of the conversion table.
Figure 8B:
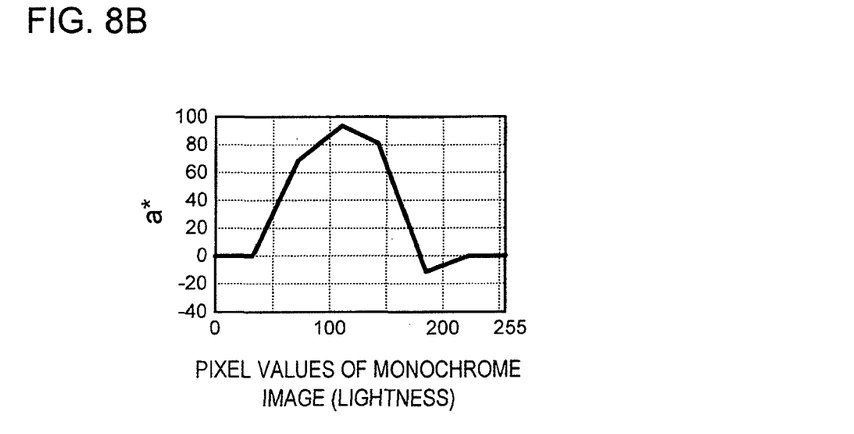
Figure 8C:
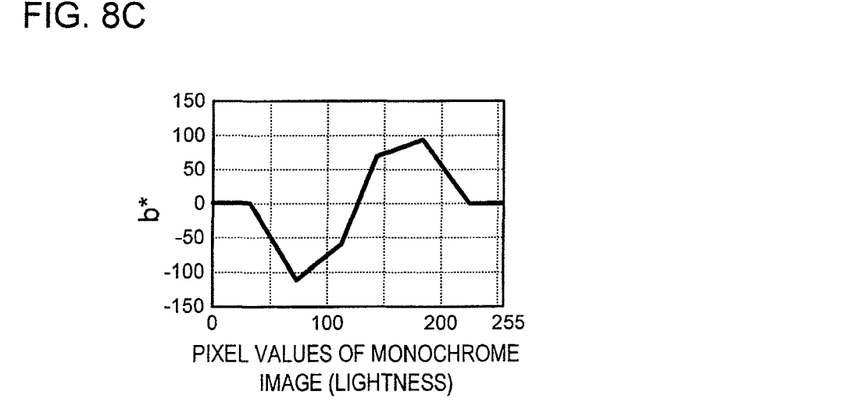
Figure 9:
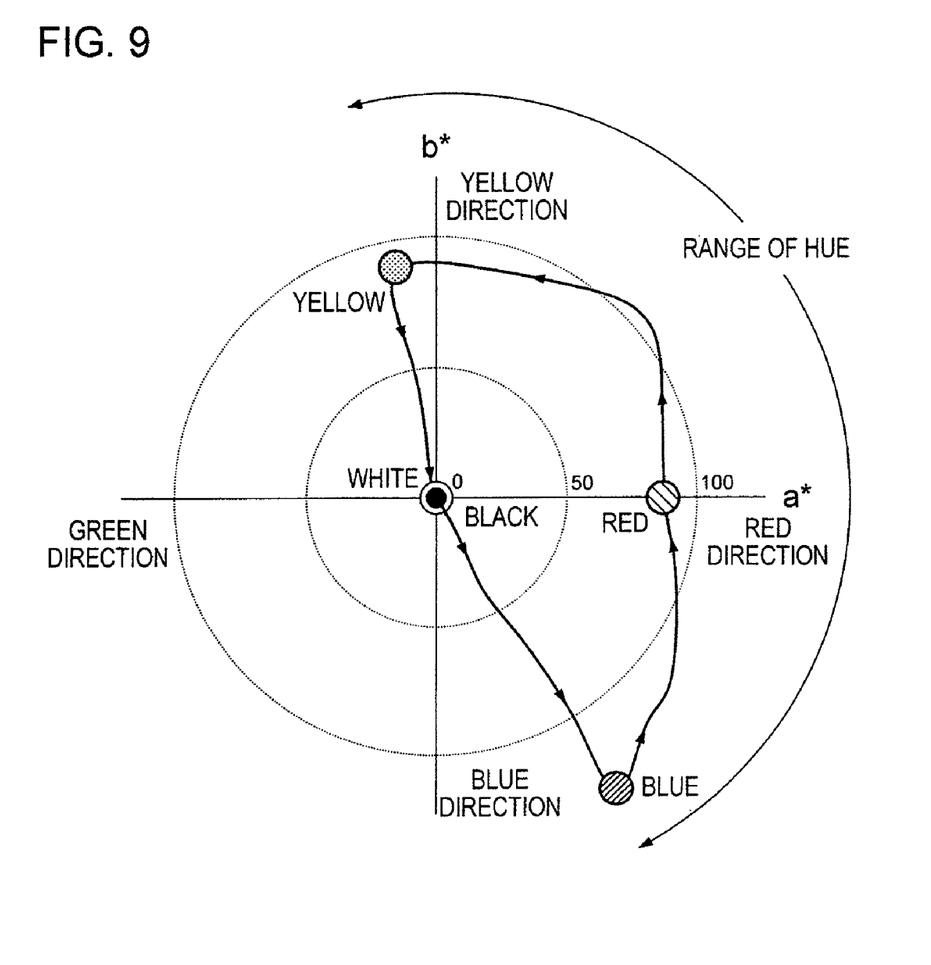
FIG. 9 is a diagram indicating chromaticities of colors corresponding to the conversion table indicated in FIGS. 8A to 8C.

FIGS. 8A to 8C are diagrams illustrating a first example of a conversion table for associating a pixel value of the monochrome image with a color. What is illustrated in FIG. 8A is referred to as the lightness calculation conversion table 41, and what are illustrated in FIGS. 8B and 8C are referred to as the chromaticity calculation conversion table 42. FIG. 9 is a diagram depicting chromaticity (chromaticness, i.e., hue and color saturation) identified by what are depicted in FIGS. 8B and 8C.

As illustrated in FIG. 8A, the lightness L* is proportional to the pixel value (lightness) of the monochrome image. The pixel value takes a value ranging from "0" to "255", and the lightness L* takes a value ranging from "0" to "100".

As illustrated in FIG. 8B, the chromaticness index a* takes a value in accordance with the pixel value. The details will be described below. A value of the chromaticness index a* takes "0" for the pixel value ranging from "0" to "32". It increases from "1.7" to "69" substantially in proportion to the pixel value ranging from "33" to "72". It increases from "69.6" to "94" substantially in proportion to the pixel value ranging from "73" to "112". The chromaticness index a* decreases from "93.6" to "81" substantially in inverse proportion to the pixel value ranging from "113" to "144". It decreases from "78.6" to "−16" substantially in inverse proportion to the pixel value ranging from "145" to "184". It increases from "−15.6" to "0" substantially in proportion to the pixel value ranging from "185" to "224". It stays at "0" for the pixel value ranging from "225" to "255".

Furthermore, as depicted in FIG. 8C, a chromaticness index b* takes a value according to the pixel value. The details will be described below. A value of the chromaticness index b* takes "0" for the pixel value ranging from "0" to "32". It decreases from "−2.8" to "−112" substantially in inverse proportion to the pixel value ranging from "33" to "72". It increases from "−110.7" to "−61" substantially in proportion to the pixel value ranging from "73" to "112". The chromaticness index b* increases from "−56.9" to "70" substantially in proportion to the pixel value ranging from "113" to "144". It increases from "70.6" to "93" substantially in proportion to the pixel value ranging from "145" to "184". It decreases from "90.7" to "0" substantially in inverse proportion to the pixel value ranging from "185" to "224". It stays at "0" for the pixel value ranging from "225" to "255".

The first embodiment is an example in which red is assigned to a medium density of the monochrome image, which is a specific example of colorization of what are depicted in FIG. 1A and FIG. 3A. An arrow in FIG. 9 indicates a change in hue of the color image that corresponds to a change in the pixel value of the monochrome image from the minimum value of "0" to the maximum value of "255". In the first embodiment, the association of the major pixel values of the monochrome image with colors of the color image is as indicated in Table 1.

TABLE 1

| Pixel value of monochrome image (lightness) | Color of color image | | | | | | |
|---|---|---|---|---|---|---|---|
| | Color name | L* | a* | b* | R | G | B |
| 0 (min. value) | Black | 0 | 0 | 0 | 0 | 0 | 0 |
| 72 (1st intermediate value) | Blue | 28.2 | 69 | −112 | 0 | 0 | 251 |
| 127 (2nd intermediate value) | Red | 49.8 | 87.9 | 0.4 | 240 | 0 | 122 |
| 184 (3rd intermediate value) | Yellow | 72.2 | −16 | 93 | 178 | 184 | 0 |
| 255 (max. value) | White | 100 | 0 | 0 | 255 | 255 | 255 |

As clearly indicated in FIG. 9, a color in the blue region whose hue is close to blue, a color in the range from blue to red in the hue circle, and a color in the range from red to yellow in the hue circle correspond to the pixel value ranging from the minimum value to the first intermediate value, the pixel value ranging from the first intermediate value to the second intermediate value, and the pixel value ranging from the second intermediate value to the third intermediate value, respectively.

Second Embodiment

Figure 10A:
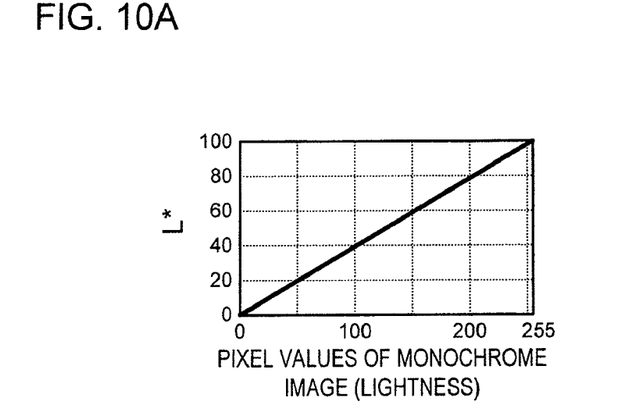
FIGS. 10A to 10C are diagram illustrating a second example of the conversion table.
Figure 10B:
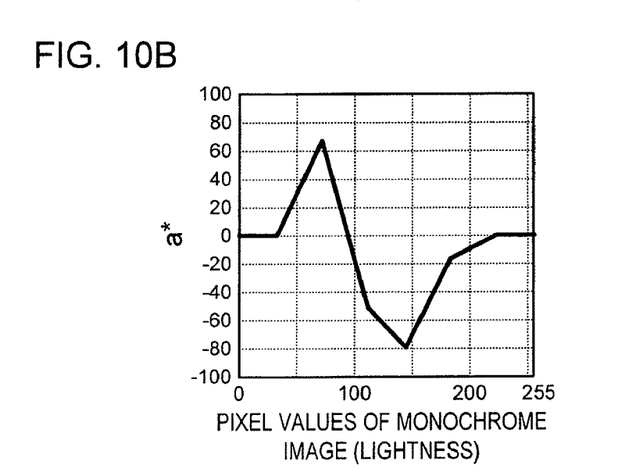
Figure 10C:
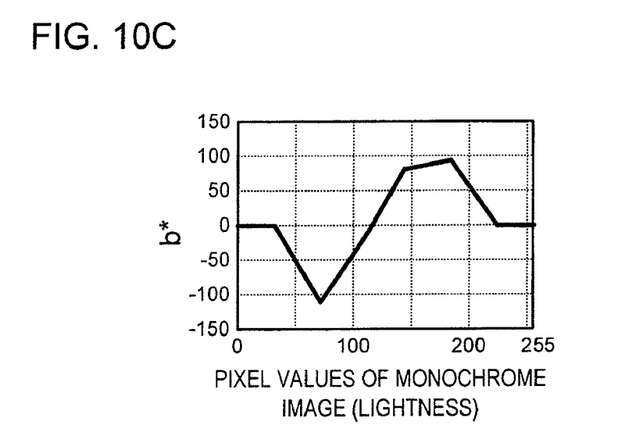
Figure 11:
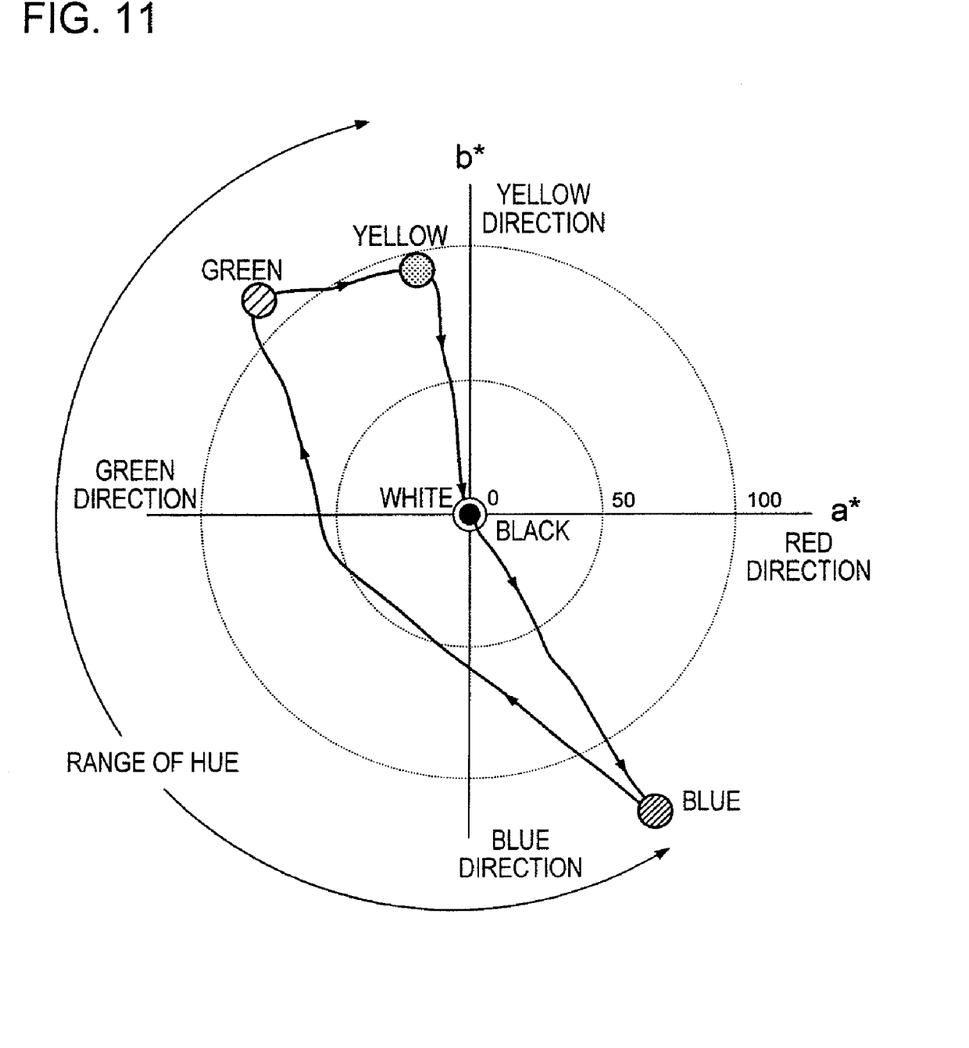
FIG. 11 is a diagram indicating chromaticities of colors corresponding to the conversion table indicated in FIGS. 10A to 10C.

FIGS. 10A to 10C are diagrams illustrating a second example of a conversion table for associating a pixel value of the monochrome image with a color. What is illustrated in FIG. 10A is referred to as the lightness calculation conversion table 41, and what are illustrated in FIGS. 10B and 10C are referred to as the chromaticity calculation conversion table 42. FIG. 11 is a diagram depicting chromaticity (chromaticness, i.e., hue and color saturation) identified by what are depicted in FIGS. 10B and 10C.

As illustrated in FIG. 10A, the lightness L* is proportional to the pixel value (lightness) of the monochrome image. The pixel value takes a value ranging from "0" to "255", and the lightness L* takes a value ranging from "0" to "100".

As illustrated in FIG. 10B, the chromaticness index a* takes a value in accordance with the pixel value. The details will be described below. A value of the chromaticness index a* takes "0" for the pixel value ranging from "0" to "32". It increases from "1.7" to "69" substantially in proportion to the pixel value ranging from "33" to "72". It decreases from "66" to "−51" substantially in inverse proportion to the pixel value ranging from "73" to "112". The chromaticness index a* decreases from "−51.9" to "−79" substantially in inverse proportion to the pixel value ranging from "113" to "144". It increases from "−77.4" to "−16" substantially in proportion to the pixel value ranging from "145" to "184". It increases from "−15.6" to "0" substantially in proportion to the pixel value ranging from "185" to "224". It stays at "0" for the pixel value ranging from "225" to "255".

Furthermore, as depicted in FIG. 10C, a chromaticness index b* takes a value according to the pixel value. The details will be described below. A value of the chromaticness index b* takes "0" for the pixel value ranging from "0" to "32". It decreases from "−2.8" to "−112" substantially in inverse proportion to the pixel value ranging from "33" to "72". It increases from "−109.6" to "−15" substantially in proportion to the pixel value ranging from "73" to "112". The chromaticness index b* increases from "−12" to "81" substantially in proportion to the pixel value ranging from "113" to "144". It increases from "81.3" to "93" substantially in proportion to the pixel value ranging from "145" to "184". It decreases from "90.7" to "0" substantially in inverse proportion to the pixel value ranging from "185" to "224". It stays at "0" for the pixel value ranging from "225" to "255".

The second embodiment is an example in which green is assigned to a medium density of the monochrome image, which is a specific example of colorization of what are depicted in FIG. 1B and FIG. 3B. An arrow in FIG. 11 indicates a change in hue of the color image that corresponds to a change in the pixel value from the minimum value of "0" to the maximum value of "255". In the second embodiment, the association of the major pixel values of the monochrome image with colors of the color image is as indicated in Table 1.

TABLE 2

| Pixel value of monochrome image (lightness) | Color of color image | | | | | | |
|---|---|---|---|---|---|---|---|
| | Color name | L* | a* | b* | R | G | B |
| 0 (min. value) | Black | 0 | 0 | 0 | 0 | 0 | 0 |
| 72 (1st intermediate value) | Blue | 28.2 | 69 | −112 | 0 | 0 | 251 |
| 127 (2nd intermediate value) | Green | 56.5 | −7.9 | 0.4 | 0 | 164 | 0 |
| 184 (3rd intermediate value) | Yellow | 72.2 | −16 | 93 | 178 | 184 | 0 |
| 255 (max. value) | White | 100 | 0 | 0 | 255 | 255 | 255 |

As clearly indicated in FIG. 11, a color in the blue region whose hue is close to blue, a color in the range from blue to green in the hue circle, and a color in the range from green to yellow in the hue circle correspond to the pixel value ranging from the minimum value to the first intermediate value, the pixel value ranging from the first intermediate value to the second intermediate value, and the pixel value ranging from the second intermediate value to the third intermediate value, respectively.

In the embodiments described above, the lightness calculation conversion table 41 and the chromaticity calculation conversion table 42 may be arranged to represent colors in a color system other than L*a*b* color system. For example, it is possible to use L*u*v* color system, CIECAM97s color appearance model, or CIECAM02 color appearance model.

Although the examples used in the embodiments are for colorization performed when a printer performs color printing, it is also possible to apply the image processing method according to the embodiments of the present invention when a monochrome image is colorized for display. For example, it is possible to display a colorized image in an image processing system configured of a scanner for reading a monochrome image, a data processing server for performing colorized processing, and a display unit for displaying the colorized image. In such a case, a color to be assigned to a density may be decided within the scope of the present invention in accordance with the color reproduction characteristics of the display unit serving as an image output device. As a modified example of the system configuration according to the present invention, a personal computer may be used instead of the data processing server as the image processing device.

According to the embodiments described above, it is possible to obtain a color image that is colorized in accordance with the lightness of the monochrome image and has a high level of color saturation in a light area close to white, a dark area close to black, and an area between the light and dark areas.

While the embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. An image processing method for converting a monochrome image into a color image, wherein, when the monochrome image is converted into the color image, a target color to be converted from each pixel of the monochrome image is decided based on first to fourth criteria according to a pixel value of said each pixel, the pixel value representing lightness of said each pixel of the monochrome image;

wherein the method comprises:

applying the first criterion to said each pixel to decide lightness of the target color for said each pixel; and applying one of the second to fourth criteria to said each pixel in accordance with the pixel value to decide a chromaticity of the target color, wherein, in the first criterion, black is assigned to the pixel value having a minimum value within a possible range that the pixel value can take, white is assigned to the pixel value having a maximum value within the range of the pixel value, or a color having lightness according to the lightness represented by the pixel value is assigned to the pixel value;

wherein, in the second criterion, a color in a blue color region is assigned to the pixel value having a value near but excluding the minimum value, wherein, in the third criterion, a color in a yellow color region is assigned to the pixel value having a value near but excluding the maximum value; and wherein, in the fourth criterion, a color in a range of hue starting from the blue color region to the yellow color region by way of a red color region or a color in a range of hue starting from the blue color region to the yellow color region by way of a green color region is assigned to the pixel value having a value in a range between the value near the minimum value and the value near the maximum value but excluding the value near the minimum value and the value near the maximum value.

2. The image processing method according to claim 1,
wherein, when the monochrome image is converted into the color image, a conversion table that associates a color with a value within the range of the pixel value is referred to;
wherein, in the conversion table, black is associated with the minimum value;
blue is associated with a first intermediate value that is larger than the minimum value but smaller than the maximum value;
a color in a blue region which is close to the blue in hue is associated with the pixel value that is larger than the minimum value but smaller than the first intermediate value;
red whose lightness is larger than that of the blue is associated with a second intermediate value that is larger than the first intermediate value but smaller than the maximum value;
a color in a range between the blue and the red in a hue circle is associated with the pixel value that is larger than the first intermediate value but smaller than the second intermediated value;
yellow is associated with a third intermediate value that is larger than the second intermediate value but smaller than the maximum value;
a color in a range between the red and the yellow in the hue circle is associated with the pixel value that is larger than the second intermediate value but smaller than the third intermediate value;
a color in a yellow region which is close to the yellow in hue is associated with the pixel value that is larger than the third intermediate value but smaller than the maximum value; and
white is associated with the maximum value.

3. The image processing method according to claim 1,
wherein, when the monochrome image is converted into the color image, a conversion table that associates a value within the range of the pixel value with a color is referred to;
wherein, in the conversion table, black is associated with the minimum value;
blue is associated with a first intermediate value that is larger than the minimum value but smaller than the maximum value;
a color in a blue region which is close to the blue in hue is associated with the pixel value that is larger than the minimum value but smaller than the first intermediate value;
green whose lightness is larger than that of the blue is associated with a second intermediate value that is larger than the first intermediate value but smaller than the maximum value;
a color in a range between the blue and the green in a hue circle is associated with the pixel value that is larger than the first intermediate value but smaller than the second intermediated value;
yellow is associated with a third intermediate value that is larger than the second intermediate value but smaller than the maximum value;
a color in a range between the green and the yellow in the hue circle is associated with the pixel value that is larger than the second intermediate value but smaller than the third intermediate value;
a color in a yellow region which is close to the yellow in hue is associated with the pixel value that is larger than the third intermediate value but smaller than the maximum value; and
white is associated with the maximum value.

4. An image processing apparatus that converts a monochrome image into a color image, comprising:
a conversion table that associates a color with a value within a possible range that a pixel value of the monochrome image can take; and
a color image generating portion that decides a target color to be converted from each pixel of the monochrome image in accordance with a pixel value of said each pixel,
wherein, in the conversion table, black is associated with the minimum value;
blue is associated with a first intermediate value that is larger than the minimum value but smaller than the maximum value;
a color in a blue region which is close to the blue in hue is associated with the pixel value that is larger than the minimum value but smaller than the first intermediate value;
red or green whose lightness is larger than that of the blue is associated with a second intermediate value that is larger than the first intermediate value but smaller than the maximum value;
a color in a range between the blue and the red in a hue circle or a color in a range between the blue and the green in the hue circle is associated with the pixel value that is larger than the first intermediate value but smaller than the second intermediated value;
yellow is associated with a third intermediate value that is larger than the second intermediate value but smaller than the maximum value;
a color in a range between the red and the yellow in the hue circle or a color in a range between the green and the yellow in the hue circle is associated with the pixel value that is larger than the second intermediate value but smaller than the third intermediate value;
a color in a yellow region which is close to the yellow in hue is associated with the pixel value that is larger than the third intermediate value but smaller than the maximum value; and
white is associated with the maximum value.

5. The image processing apparatus according to claim 4,
wherein, in the conversion table, the red whose lightness is larger than that of the blue is associated with the second intermediate;
the color in the range between the blue and the red in the hue circle is associated with the pixel value that is larger than the first intermediate value but smaller than the second intermediated value; and
the color in the range between the red and the yellow in the hue circle is associated with the pixel value that is larger than the second intermediate value but smaller than the third intermediate value.

6. The image processing apparatus according to claim 4,
wherein, in the conversion table, the green whose lightness is larger than that of the blue is associated with the second intermediate;
the color in the range between the blue and the green in the hue circle is associated with the pixel value that is larger than the first intermediate value but smaller than the second intermediated value; and
the color in the range between the green and the yellow in the hue circle is associated with the pixel value that is larger than the second intermediate value but smaller than the third intermediate value.

7. A color image generating system for generating a color image corresponding to a monochrome image, comprising:
- an image input device that scans the monochrome image recorded on paper and outputs gray data indicating lightness of each pixel;
- an image processing apparatus that refers to a conversion table that associates a color with a value within a possible range that a pixel value can take including a minimum value and a maximum value of said each pixel of the monochrome image and converts the gray data into color data for said each pixel; and
- an image output device that visualizes the color data as the color image,
- wherein, in the conversion table, black is associated with the minimum value;
- blue is associated with a first intermediate value that is larger than the minimum value but smaller than the maximum value;
- a color in a blue region which is close to the blue in hue is associated with the pixel value that is larger than the minimum value but smaller than the first intermediate value;
- red or green whose lightness is larger than that of the blue is associated with a second intermediate value that is larger than the first intermediate value but smaller than the maximum value;
- a color in a range between the blue and the red in a hue circle or a color in a range between the blue and the green in the hue circle is associated with the pixel value that is larger than the first intermediate value but smaller than the second intermediated value;
- yellow is associated with a third intermediate value that is larger than the second intermediate value but smaller than the maximum value;
- a color in a range between the red and the yellow in the hue circle or a color in a range between the green and the yellow in the hue circle is associated with the pixel value that is larger than the second intermediate value but smaller than the third intermediate value;
- a color in a yellow region which is close to the yellow in hue is associated with the pixel value that is larger than the third intermediate value but smaller than the maximum value; and
- white is associated with the maximum value.

8. The color image generating system according to claim 7,
- wherein, in the conversion table, the red whose lightness is larger than that of the blue is associated with the second intermediate;
- the color in the range between the blue and the red in the hue circle is associated with the pixel value that is larger than the first intermediate value but smaller than the second intermediated value; and
- the color in the range between the red and the yellow in the hue circle is associated with the pixel value that is larger than the second intermediate value but smaller than the third intermediate value.

9. The color image generating system according to claim 7,
- wherein, in the conversion table, the green whose lightness is larger than that of the blue is associated with the second intermediate;
- the color in the range between the blue and the green in the hue circle is associated with the pixel value that is larger than the first intermediate value but smaller than the second intermediated value; and
- the color in the range between the green and the yellow in the hue circle is associated with the pixel value that is larger than the second intermediate value but smaller than the third intermediate value.

10. The color image generating system according to claim 7,
- wherein the blue, the red, the green, and the yellow are colors within a color reproductive range of the image output device and have a highest level of color saturation among individual similar colors corresponding thereto, respectively.

11. The color image generating system according to claim 10,
- the image output device is a printer that prints the color data on paper as the color image.

12. The color image generating system according to claim 10,
- the image output device is a display that displays the color data on a screen as the color image.

* * * * *